United States Patent
Pickens et al.

(10) Patent No.: US 9,419,456 B2
(45) Date of Patent: *Aug. 16, 2016

(54) BATTERY PACK-TO-UNIVERSAL SERIAL BUS POWER DEVICES

(71) Applicant: Custom LeatherCraft Manufacturing Co., Inc., South Gate, CA (US)

(72) Inventors: Ron A. Pickens, Owasso, OK (US); Matthew D. Noble, Los Angeles, CA (US)

(73) Assignee: Custom LeatherCraft Manuf. Co., Inc., South Gate, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/485,742

(22) Filed: Sep. 14, 2014

(65) Prior Publication Data

US 2015/0084578 A1    Mar. 26, 2015

Related U.S. Application Data

(60) Provisional application No. 61/882,045, filed on Sep. 25, 2013.

(51) Int. Cl.
*H01M 10/46* (2006.01)
*H02J 7/00* (2006.01)

(52) U.S. Cl.
CPC ............ *H02J 7/0054* (2013.01); *H02J 7/0029* (2013.01); *H02J 7/0042* (2013.01); *H02J 2007/0062* (2013.01)

(58) Field of Classification Search
CPC ................................ H02J 7/0042; H02J 7/355
USPC .................................. 320/107, 111, 114, 115
See application file for complete search history.

(56) References Cited

U.S. PATENT DOCUMENTS

| | | | | |
|---|---|---|---|---|
| 2012/0262117 A1* | 10/2012 | Ferber | ................... | H02J 7/0047 320/111 |
| 2014/0327401 A1* | 11/2014 | Pickens | ................. | H02J 7/0042 320/127 |
| 2015/0084596 A1* | 3/2015 | Pickens | ................... | A45F 5/021 320/127 |
| 2015/0318716 A1* | 11/2015 | Pickens | ................. | H02J 7/0003 320/110 |

* cited by examiner

Primary Examiner — Edward Tso

(57) ABSTRACT

A device includes a battery pack receptacle that removably connects to a battery pack used for a cordless device. A universal serial bus (USB) port is connected to the battery pack receptacle. The battery pack is used as a power source for the USB port. An attachment device is connected to the battery pack receptacle that attaches the battery pack receptacle to a utility bag.

20 Claims, 10 Drawing Sheets

BATTERY PACK-TO-UNIVERSAL SERIAL BUS POWER DEVICES

CROSS-REFERENCE TO RELATED APPLICATIONS

This application claims the priority benefit of U.S. Provisional Patent Application Ser. No. 61/882,045, filed Sep. 25, 2013, incorporated herein by reference in its entirety.

TECHNICAL FIELD

One or more embodiments relate generally to universal serial bus (USB) power, and in particular, use of a portable tool battery pack as a power source for USB devices using an receptacle/adapter.

BACKGROUND

Portable cordless power tools typically include replaceable and removable battery packs. The battery packs may have different voltages, such as 12V, 18V, 24V, etc. The cordless power tools (e.g., a cordless drill, cordless screwdriver, etc.) may be packaged with a spare battery pack that may be charged in a charger while the other battery pack is in use.

SUMMARY

One embodiment includes a battery pack receptacle that removably connects to a battery pack used for a cordless device. A universal serial bus (USB) port is connected to the battery pack receptacle. The battery pack is used as a power source for the USB port. An attachment device is connected to the battery pack receptacle that attaches the battery pack receptacle to a utility bag.

Another embodiment comprises a system that includes a utility bag. A battery pack receptacle is coupled to the utility bag and removably receives a battery pack used for a cordless device. An attachment device is coupled to the battery pack receptacle and attaches the battery pack receptacle to the utility bag. A USB port is coupled to the battery pack receptacle. The battery pack receptacle transfers power from a received battery pack to the USB port.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

Figure 1:
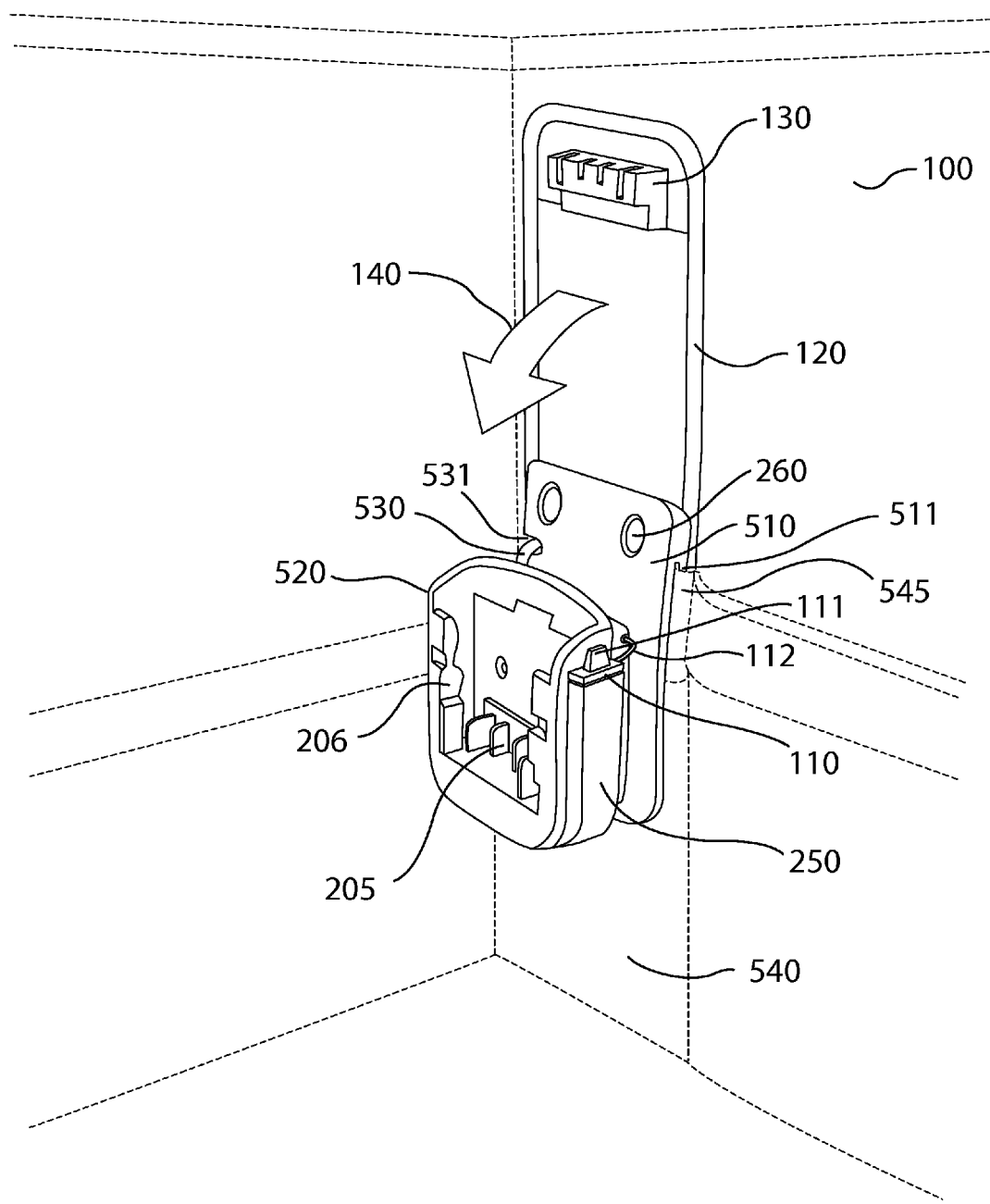
FIG. 1 illustrates a perspective view of an receptacle/adapter for a battery pack with a protection component in an unprotected state showing an example implementation with a utility bag according to one embodiment.

The following description is made for the purpose of illustrating the general principles of the one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for battery pack receptacles for transferring power from a cordless device battery pack to a USB port and/or a USB receptacle for a utility bag, as well as operation and/or component parts thereof. While the following description will be described in terms of cordless device battery pack power for USB devices, for clarity and to place the one or more embodiments in context, it should be kept in mind that the teachings herein may have broad application to all types of systems, devices and applications.

The description may disclose several preferred embodiments of battery pack to USB connections for powering/charging electronic devices, as well as operation and/or component parts thereof. While the following description will be described in terms of battery pack to USB connections for powering/charging electronic devices and systems for clarity and to place the invention in context, it should be kept in mind that the teachings herein may have broad application to all types of systems, devices and applications One or more embodiments relate to cordless device battery pack power used for USB devices. In one embodiment, an apparatus includes a battery pack receptacle that removably connects to a battery pack used for a cordless device. A universal serial bus (USB) port is connected to the battery pack receptacle. The battery pack is used as a power source for the USB port. An attachment device is connected to the battery pack receptacle that attaches the battery pack receptacle to a utility bag.

One embodiment provides a system that includes a utility bag. A battery pack receptacle is coupled to the utility bag and removably receives a battery pack used for a cordless device. An attachment device is coupled to the battery pack receptacle and attaches the battery pack receptacle to the utility bag. A USB port is coupled to the battery pack receptacle. The battery pack receptacle transfers power from a received battery pack to the USB port.

One embodiment includes charging/powering an electronic device that may be employed in multiple housings, such as utility bags, fishing bags, backpacks, duffel bags, tool boxes, tool carriers, sports bags, luggage, emergency services bags, cases, coolers, etc. It should be noted that while utility bags are shown and discussed for housing the embodiments, other housings may also be implemented (e.g., pocket books, fanny packs, stand-alone containers or devices, bucket bags, etc. In other embodiments, no housing is required and the battery pack receptacle and USB receptacle or port may be integrated into a single component or housing without a utility bag or other container.

FIG. 1 illustrates a perspective view 100 of a receptacle/adapter 520 for a battery pack with a protection component 120 in an unprotected state showing an example implementation with a utility bag 540 according to one embodiment. In one embodiment, the protection component 120 includes a battery connector terminal protection component 130 that may be placed over/onto the battery connectors terminals 205. In one embodiment, the protection component is a flap or cover that covers the battery terminal connectors for protection. In other embodiments, the protection component 120 may not include the battery connector terminal protection component 130. In one embodiment, the protection component may comprise of a solid cover, a removable cover, etc. for protecting the battery terminal connectors 205 from damage (e.g., inserting a tool or item into a utility bag). In one embodiment, the protection component 120 may be moved in the direction of the arrow 140 to protect the battery terminal connectors 205 and the receptacle/adapter 520 components. In one embodiment, the battery connector terminal protection component 130 may be made of rubber, plastic, gel, etc.

In one embodiment, the receptacle/adapter 520 includes a USB connection port 250. In one embodiment, the receptacle/adapter 520 includes a USB cord 530 having a length and including a USB port at the end (e.g., male or female). In one embodiment, the length of the USB cord 530 may comprise any desirable length and may be based on implementation (e.g., 6 in.-6 ft., etc.). In one embodiment, the receptacle/adapter may have more than one USB connection ports 250 that are integrated with the receptacle/adapter 520.

In one embodiment, the receptacle/adapter 520 includes a USB port protection element 110 that may be placed into the USB port 250 to protect the USB port 250 from damage from other items, elements (e.g., sand, dirt, liquids, etc.). In one embodiment, the protection element 110 includes a grasping element 111. In one embodiment, the protection element 110 may include an attachment component 112, such as a cord, metal, rubber, plastic, etc. for attaching the protection element to the receptacle/adapter 520.

In one embodiment, the receptacle/adapter 520 may include attachment portions 260 for either permanently or removably attaching the receptacle/adapter to a utility bag 540 or other device. In one embodiment, the receptacle/adapter 520 includes a channel or cut-out portion 531 for passing the cord 530 through a front coupling portion 510.

In one embodiment, the receptacle/adapter 520 includes a rear coupling portion 511. In one embodiment, a gap between the front coupling portion 510 and the rear coupling portion 511 is fitted over material of a pocket 545 of the utility bag 540 for placement of the receptacle/adapter 520.

In one embodiment, the USB cord 530 may be fitted into a conduit, tunnel, groove, etc. of utility bags, bags, cases, boxes, coolers, etc.

In one embodiment, the receptacle/adapter 520 may be positioned in a pocket, clipped to a pocket, part of a pocket, positioned inside a utility bag, part of a wall of a utility bag (e.g., a side-wall, an end-wall, etc.), container, case, box, cooler, etc. as desired.

Figure 2:
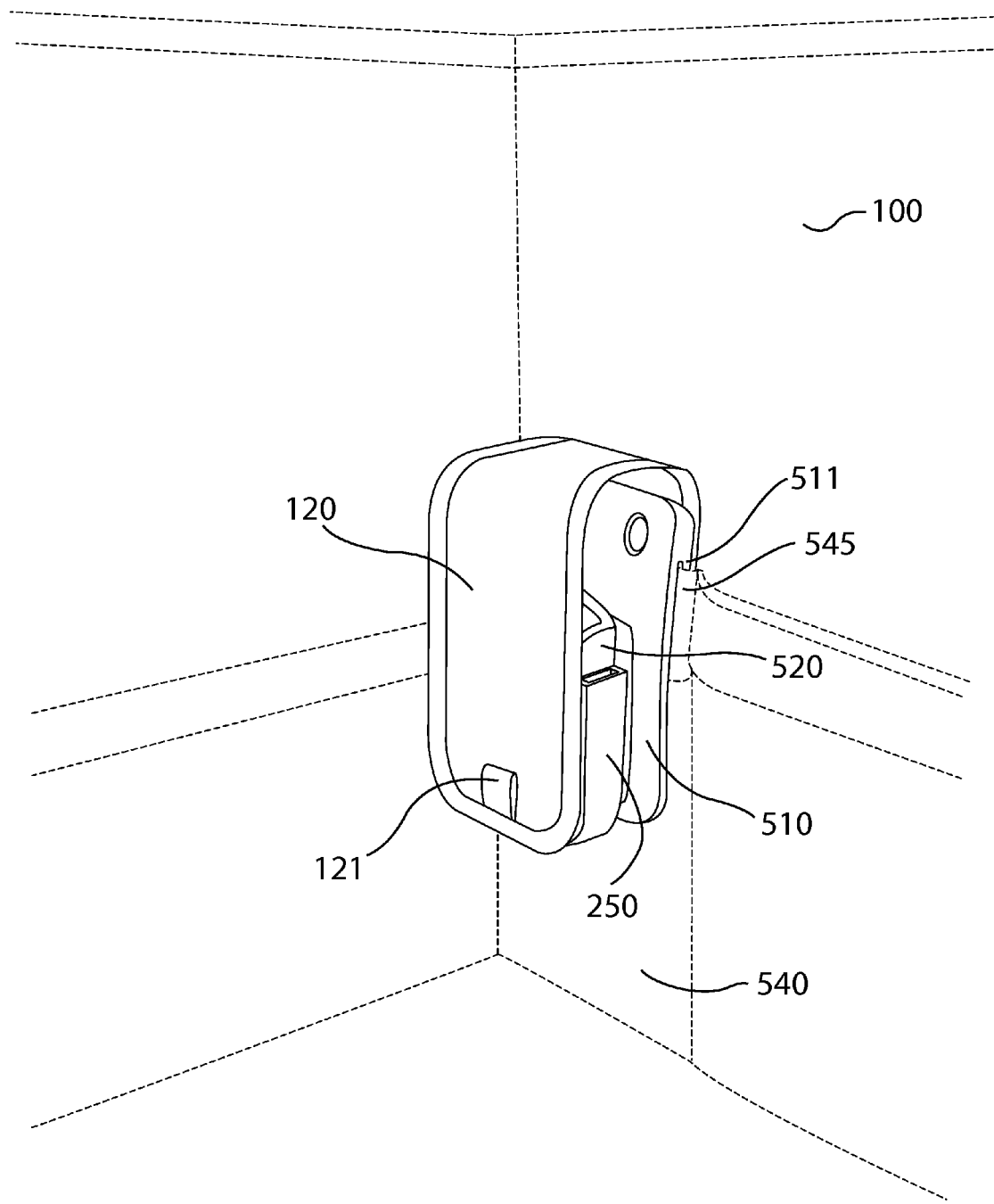
FIG. 2 illustrates a perspective view of an receptacle/adapter for a battery pack with a protection component in a protected state showing an example implementation with a utility bag according to one embodiment.

FIG. 2 illustrates a perspective view 100 of a receptacle/adapter 520 for a battery pack with a protection component 120 in a protected state showing an example implementation with a utility bag 540 according to one embodiment. In one embodiment, the protection component includes a handle 121. In one embodiment, the handle 121 may include hook and loop fasteners for coupling to a wall of the utility bag 540. In other embodiments, the protection component includes the battery connector terminal protection component 130 and the handle 121 makes it easier for a user to pull up on the protection component 120 and disengage the battery connector terminal protection component 130 from the battery connector terminals 205.

Figure 3:
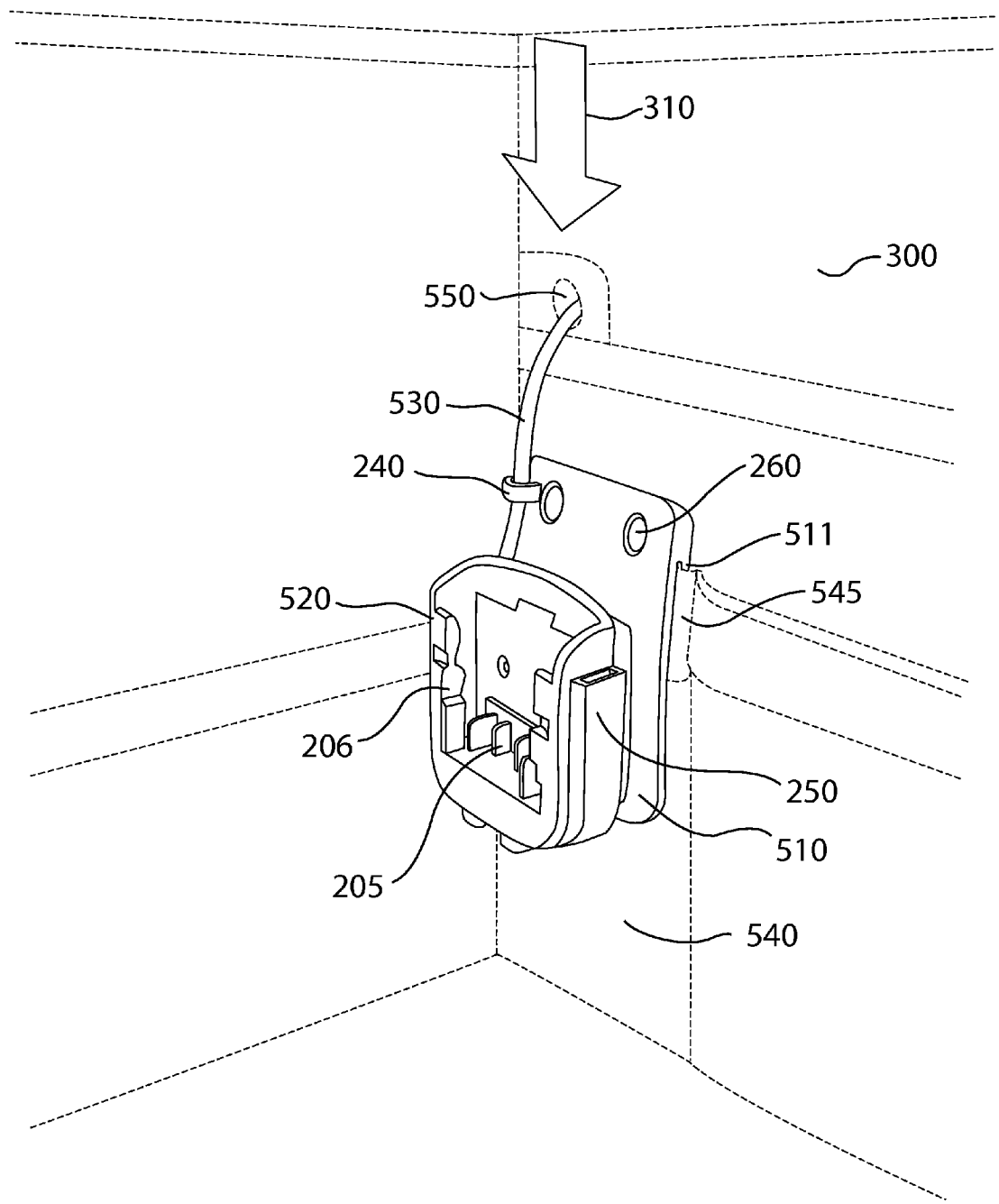
FIG. 3 illustrates a perspective view of another receptacle/adapter for a battery pack showing an example implementation with a utility bag according to one embodiment.

FIG. 3 illustrates a perspective view 300 of another receptacle/adapter 520 for a battery pack showing an example implementation with a utility bag 540 according to one embodiment. In one embodiment, the receptacle/adapter 520 does not include the protection component 120. In one embodiment, the receptacle/adapter 520 includes a USB cord guide element 240 (e.g., a loop, open loop, removable portion of a loop, etc.) that may be placed around or over the USB cord 530 for maintaining the USB cord 530 in a desired position. In one embodiment, the USB cord 530 may be placed through a through-hole 550 of the example utility bag 540.

Figure 4:
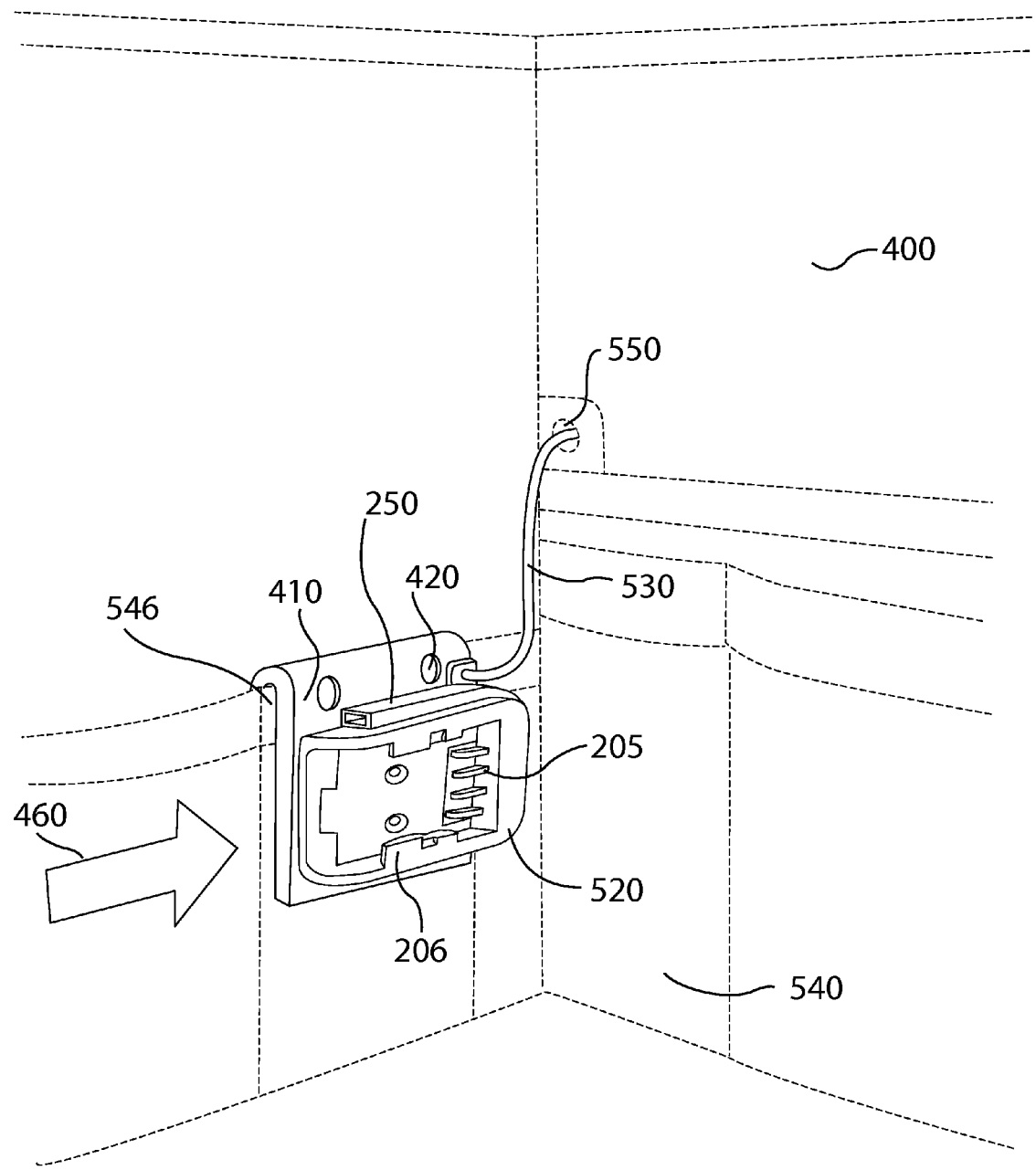
FIG. 4 illustrates a perspective view of yet another receptacle/adapter for a battery pack showing an example implementation with a utility bag according to one embodiment.

FIG. 4 illustrates a perspective view 400 of yet another receptacle/adapter 520 for a battery pack showing an example implementation with a utility bag 540 according to one embodiment. In one embodiment, the receptacle/adapter 520 may be mounted horizontally on a pocket 546 or material that provides for placement of the attachment mounting element 410. In one embodiment, the receptacle/adapter 520 is fixed to the attachment mounting element 410. In one embodiment, a battery pack slides or clips into place on the receptacle/adapter 520 in the direction of the arrow 460. In one embodiment, the receptacle/adapter 520 may be removably coupled to the pocket 546 or permanently positioned on the utility bag 540 (or other device) using the through-hole 420 and fastening (e.g., using known fastening means, such as rivets, bolts/screws, snaps, etc.). In one embodiment, the receptacle/adapter 520 may be fastened to the utility bag 540 (or other device) using hook and loop fasteners.

Figure 5:
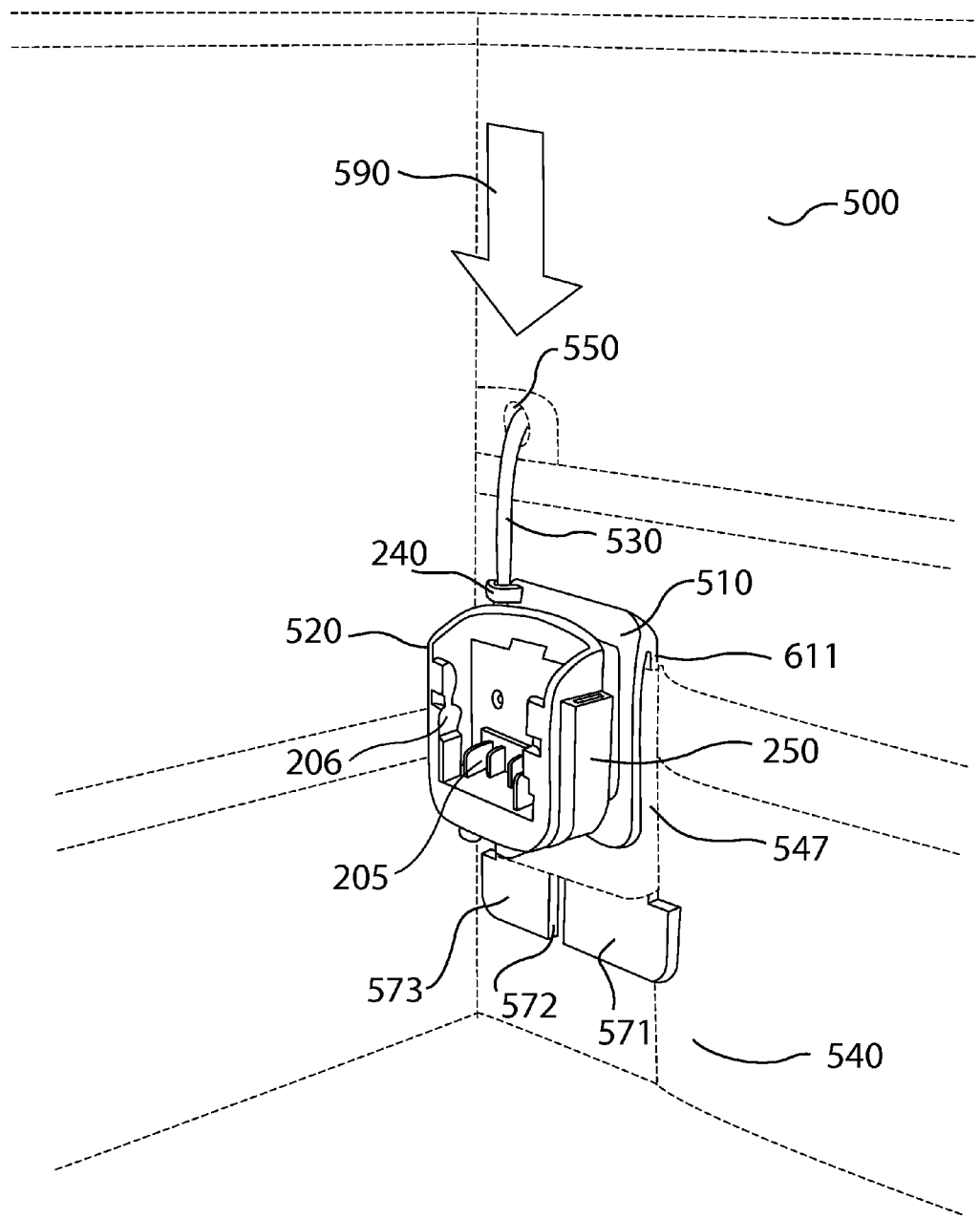
FIG. 5 illustrates a perspective view of still another receptacle/adapter for a battery pack showing an example implementation with a utility bag according to one embodiment.

FIG. 5 illustrates a perspective view 500 of still another receptacle/adapter 520 for a battery pack showing an example implementation with a utility bag 540 (or other device) according to one embodiment. In one embodiment, the receptacle/adapter 520 includes a front coupling portion 510, a rear coupling portion 611, a first foot portion 571, and a second foot portion 573, where a gap or groove 572 is formed between the first foot portion 571 and the second foot portion 573. In one embodiment, the foot portions 571 and 573 may be forced towards one another (each towards the gap 572) such that the width of the lower rear coupling portion 611 fits within the material 547 when inserted and expands back after the forced is removed, which creates a locking or fastening of the foot portions 571 and 573 outside the width of the material 547 and prevents removal unless the foot portions 571 and 573 are forced towards each other and the receptacle/adapter 520 is forced out of the material 547 that overlaps a portion of the utility bag 540 (or other device). In one embodiment, the material 547 overlaps a portion of the utility bag 540 (or other device). In one embodiment, the receptacle/adapter 520 is removably coupled to the material 547. In one embodiment, a battery pack slides or clips into place on the receptacle/ adapter 520 in the direction of the arrow 590. In one example, the material 547 forms a sleeve for holding the receptacle/adapter 520 using the foot portions 571 and 573, and the front coupling portion 510 and rear coupling portion 611.

In another example embodiment, the receptacle/adapter 520 may be permanently attached to a utility bag 540 (or other device), for example, using rivets, nuts and bolts, heat welding, epoxy welding, etc. In another example embodiment, the receptacle/adapter 520 may be mounted to material 547 internally or externally to the utility bag 540 (or other device).

Figure 6:
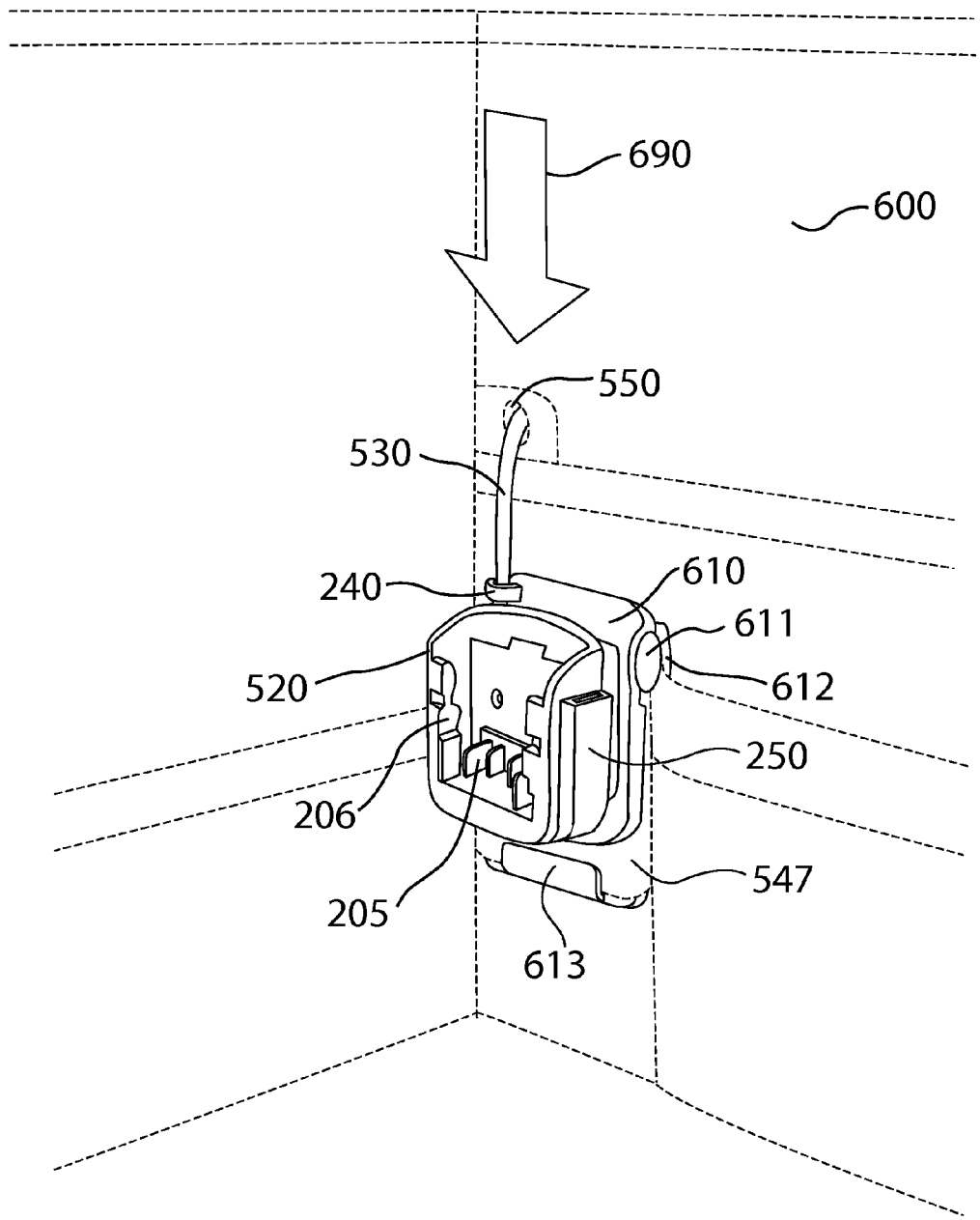
FIG. 6 illustrates a perspective view of another receptacle/adapter for a battery pack showing an example implementation with a utility bag according to one embodiment.

FIG. 6 illustrates a perspective view 600 of another receptacle/adapter 520 for a battery pack showing an example implementation with a utility bag 540 (or other device) according to one embodiment. In one embodiment, the receptacle/adapter 520 includes a front coupling portion 610, a rear coupling portion 612, a rotational element 611, and a retaining portion 613 coupled to the rear coupling portion 612. In one example, the retaining portion 613 is curved upward. In one embodiment, retaining portion 613 has material 547 of a utility bag 540 (or other device) fit within the material 547 when inserted, which creates a locking or fastening of the rear coupling portion 612 and prevents removal unless the front coupling portion 610 and rear coupling portion 612 are forced downward to release the material 547 from the retaining portion 613. In one embodiment, the material 547 overlaps a portion of the utility bag 540 (or other device). In one embodiment, the receptacle/adapter 520 is removably coupled to the material 547. In one embodiment, a battery pack slides or clips into place on the receptacle/adapter 520 in the direction of the arrow 690. In one embodiment, the front coupling portion 610, rotational element 611 and the rear coupling portion 612 form a spring clip type of device that may be pinched or grasped at the top to force the lower portion of the front coupling portion 610 and the lower portion of the rear coupling portion 612 apart, and released to force the lower portion of the front coupling portion 610 and the lower portion of the rear coupling portion 612 towards one another to clip to material, such as material 547.

In another example embodiment, the receptacle/adapter 520 may be permanently attached to a utility bag 540 (or other device), for example, using rivets, nuts and bolts, heat welding, epoxy welding, etc. In another example embodiment, the receptacle/adapter 520 may be mounted to material 547 internally or externally to the utility bag 540 (or other device).

Figure 7:
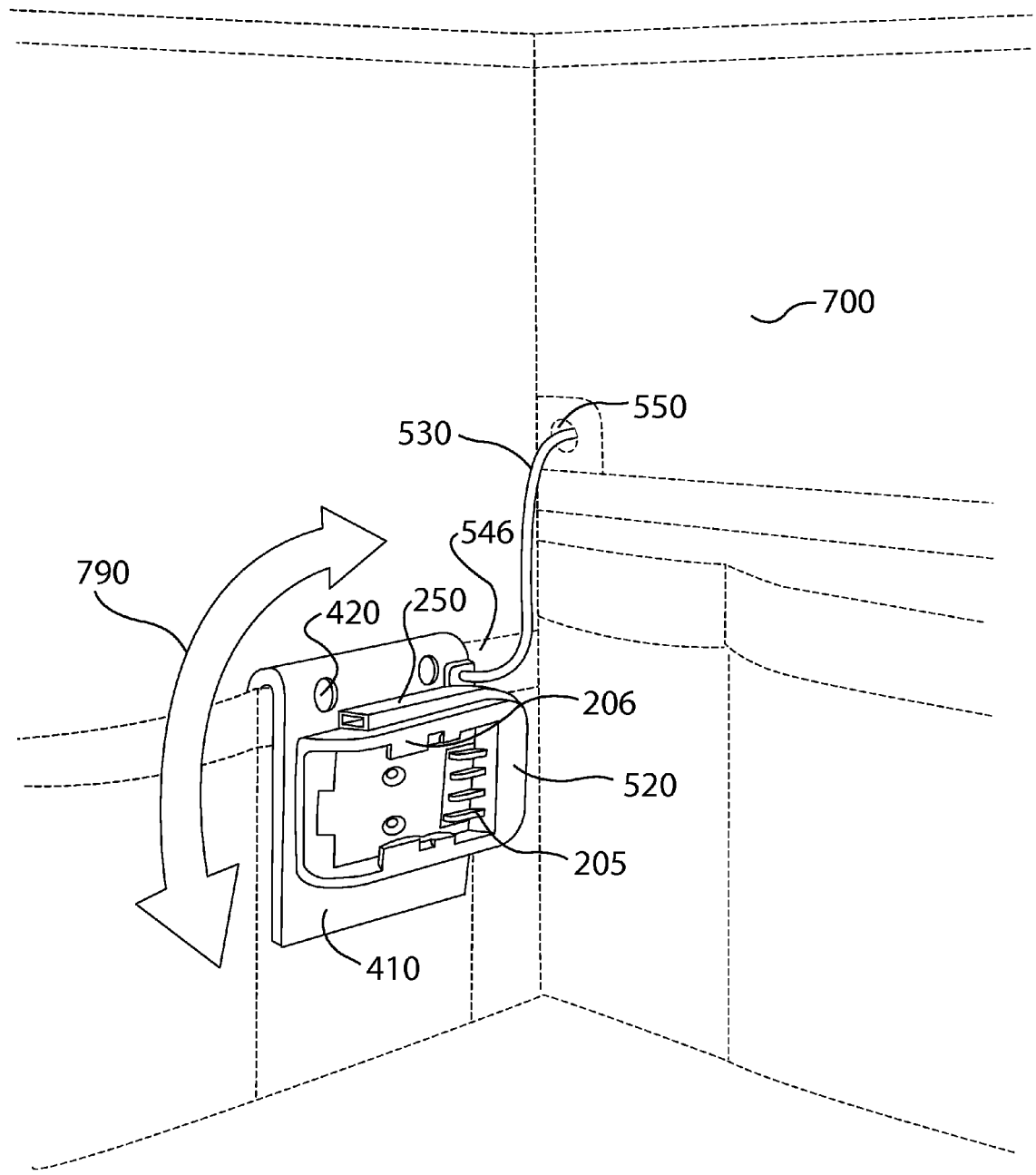
FIG. 7 illustrates a perspective view of a rotatable receptacle/adapter for a battery pack shown in a first orientation showing an example implementation with a utility bag according to one embodiment.

FIG. 7 illustrates a perspective view 700 of a rotatable receptacle/adapter 520 for a battery pack shown in a first orientation (e.g., horizontal) showing an example implementation with a utility bag or other device, according to one embodiment. In one embodiment, the receptacle/adapter 520 may be mounted horizontally on a pocket 546 or material that provides for placement of the attachment mounting element 410. In one embodiment, the receptacle/adapter 520 is rotatably mounted to the attachment mounting element 410 to provide for rotation in the direction of the arrows 790. In one embodiment, a battery pack slides or clips into place on the receptacle/adapter 520. In one embodiment, the receptacle/adapter 520 may be removably coupled to the pocket 546 or permanently positioned on the utility bag (or other device) using the through-hole 420 and fastening (e.g., using known fastening means, such as rivets, bolts/screws, snaps, etc.). In one embodiment, the receptacle/adapter 520 may be fastened to the utility bag (or other device) using hook and loop fasteners.

Figure 8:
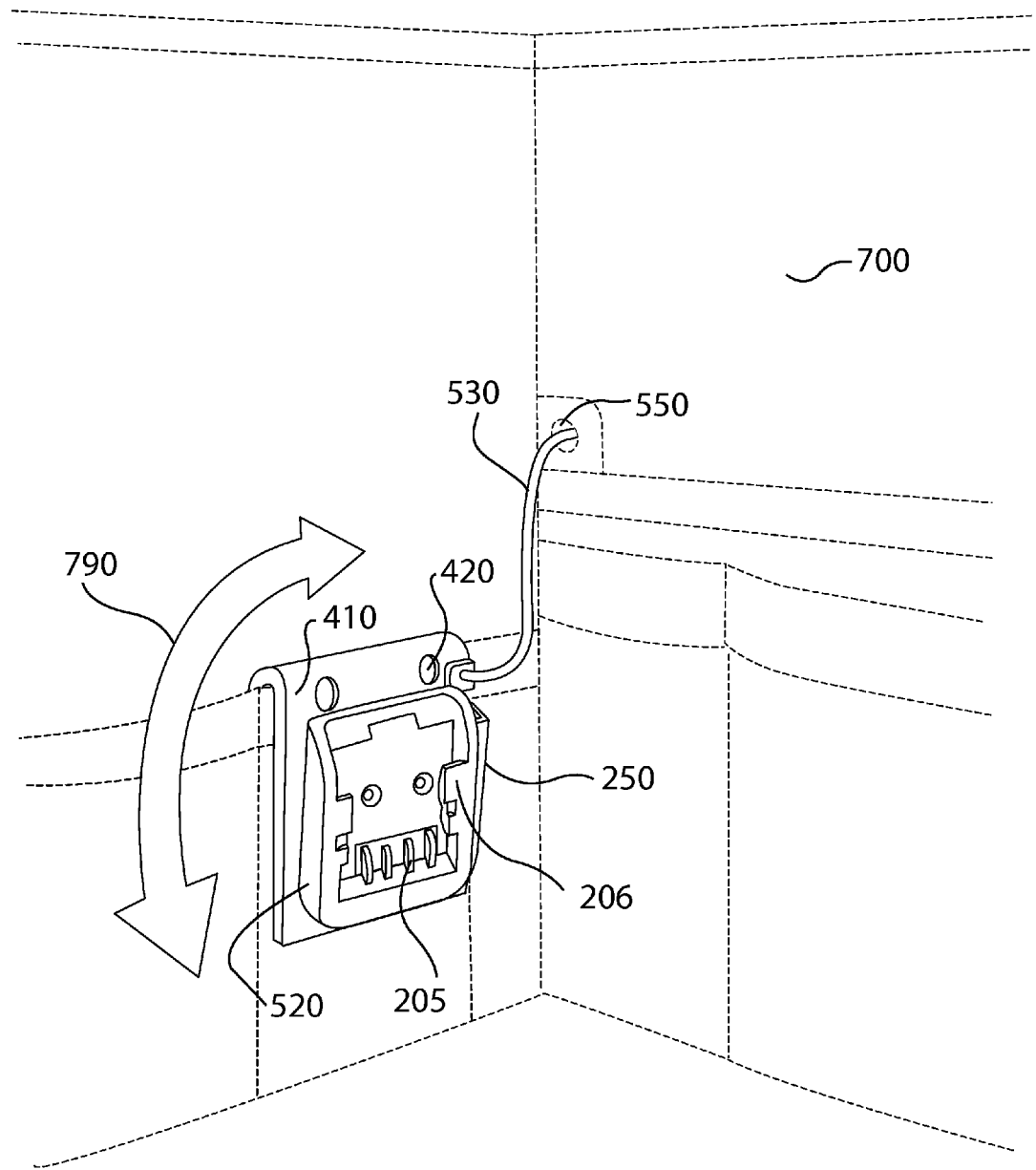
FIG. 8 illustrates a perspective view of a rotatable receptacle/adapter for a battery pack shown in a second orientation showing an example implementation with a utility bag according to one embodiment.

FIG. 8 illustrates a perspective view 700 of a rotatable receptacle/adapter 520 for a battery pack shown in a second orientation (e.g., vertical) showing an example implementation with a utility bag according to one embodiment. In one embodiment, the receptacle/adapter 520 may be mounted vertically on a pocket 546 or material that provides for placement of the attachment mounting element 410. In one embodiment, the receptacle/adapter 520 is rotatably mounted to the attachment mounting element 410 to provide for rotation in the direction of the arrows 790.

Figure 9:
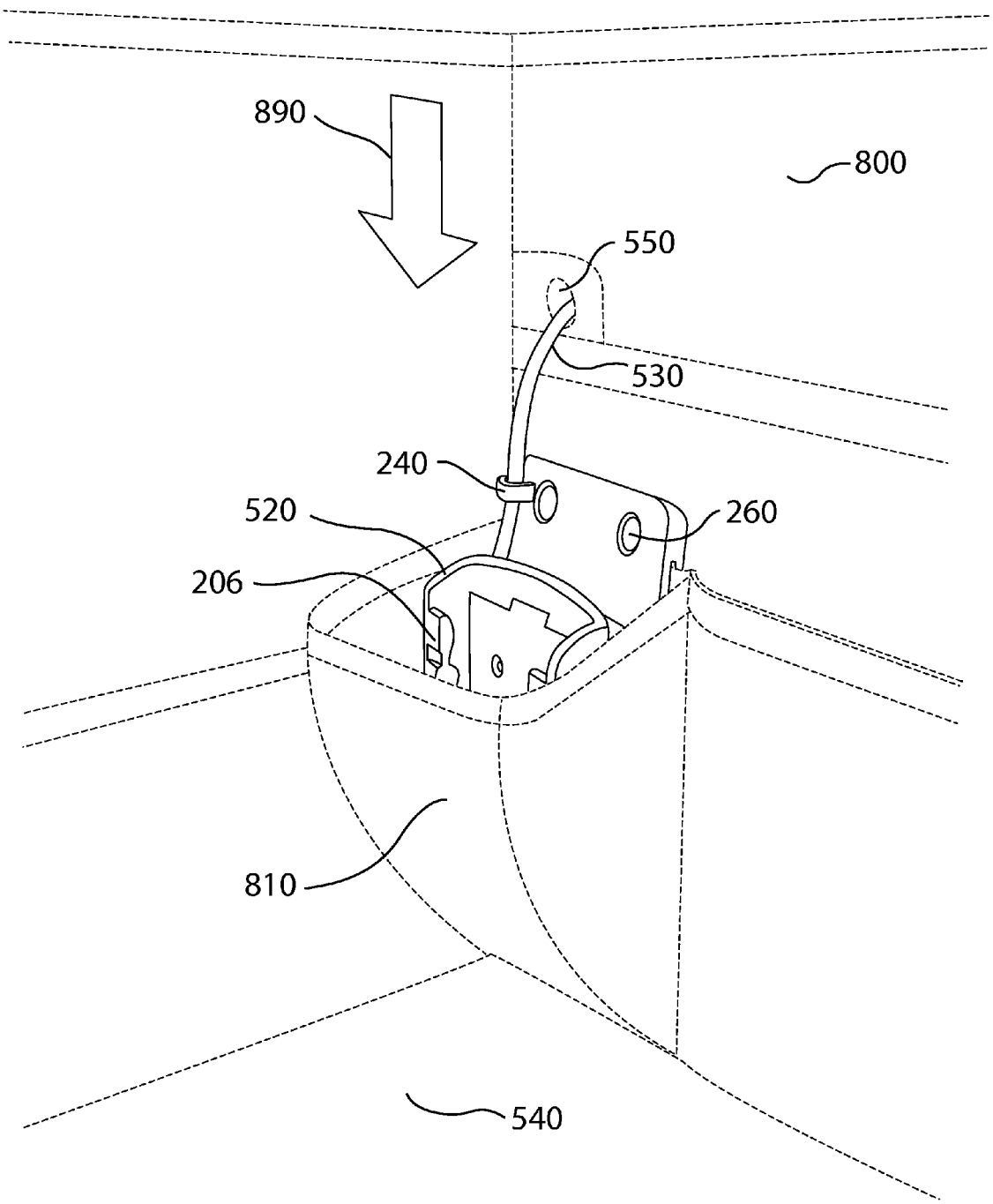
FIG. 9 illustrates a perspective view of an receptacle/adapter for a battery pack showing an example implementation with a utility bag according to one embodiment.

FIG. 9 illustrates a perspective view 800 of a receptacle/adapter 520 for a battery pack showing an example implementation with a utility bag 540 (or other device) according to one embodiment. In one embodiment, the receptacle/adapter 520 may be positioned into a pocket or compartment 810 that may be vertically or horizontally attached to the utility bag 540 (or other device). In one embodiment, a battery pack may be inserted into the receptacle/adapter 520 in the direction of the arrow 890.

Figure 10:
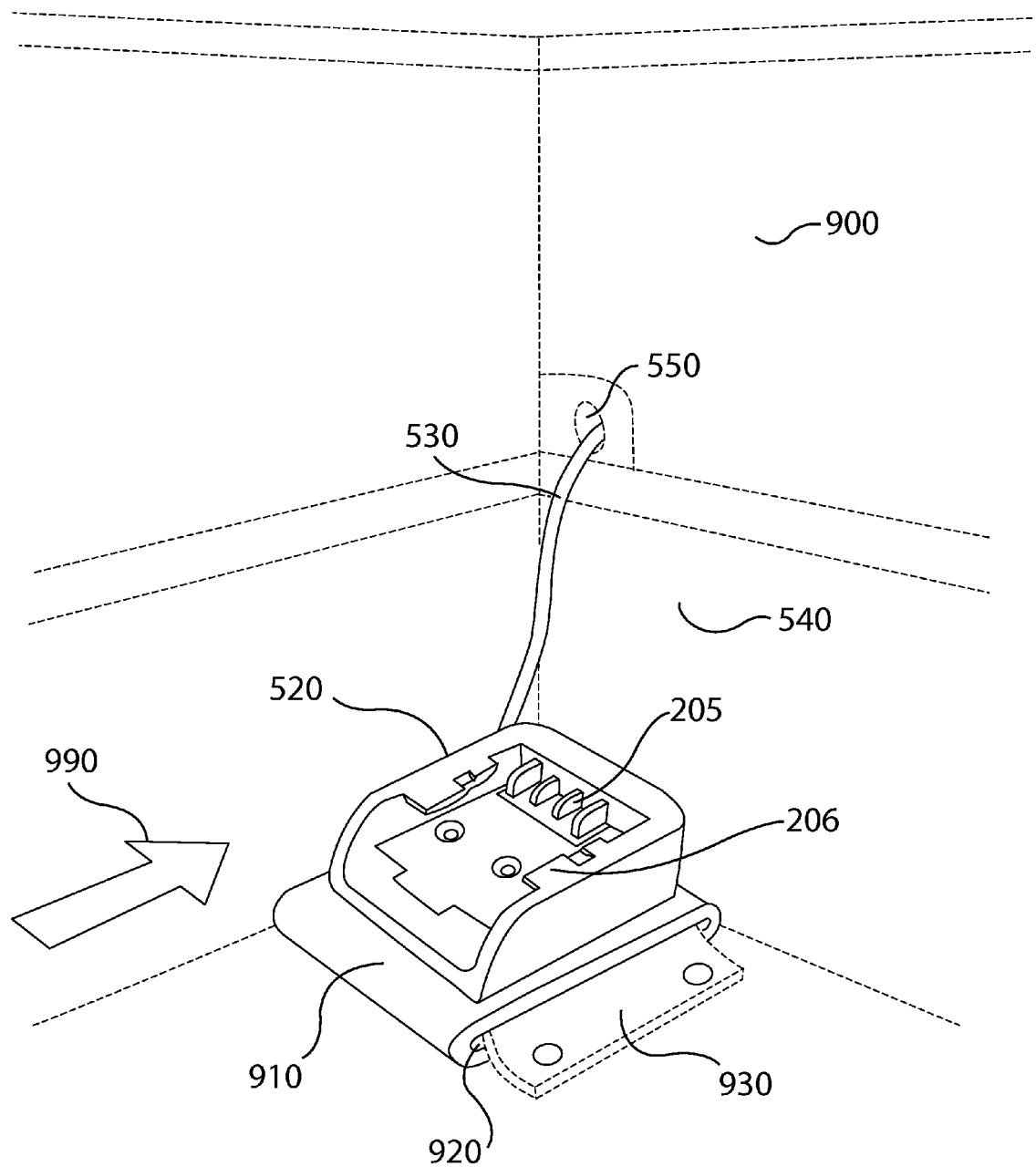
FIG. 10 illustrates a perspective view of another receptacle/adapter for a battery pack showing an example implementation with a utility bag according to one embodiment.

FIG. 10 illustrates a perspective view 900 of another receptacle/adapter 520 for a battery pack showing an example implementation with a utility bag 540 according to one embodiment. In one embodiment, the receptacle/adapter 520 is coupled to a mounting element 910. In one embodiment, the mounting element 910 forms a fully or partially closed loop where material 930 may be fastened within a channel 920 within the mounting element 910. In one embodiment, the receptacle/adapter 520 is mounted horizontally within the utility bag 540 (or other device). In one embodiment, a battery pack may be inserted within the receptacle/adapter 520 in the direction of the arrow 990. In one embodiment, the receptacle/adapter 520 may be mounted on a wall of the utility bag 540 (either vertically, horizontally, or angled). In one embodiment, the receptacle/adapter 520 is either permanently or removably connected to the material 930.

In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the receptacle/adapter 520 includes metal connectors 205 that make contact with contacts of an inserted battery pack for passing electricity from the battery pack to the receptacle/adapter 520 and through the cord 530 (add optionally to a USB connector 250.

In one or more embodiments, the receptacle/adapter 520 is movable to multiple connection portions of the interior portion of a utility bag 540 or other device in order to fit different sized battery packs. In one embodiment, the receptacle/adapter 520 includes multiple sized slots/grooves and multiple placed electrical connectors 205 for fitment of different battery pack sizes and or battery packs of different voltages.

In one or more embodiment, the receptacle/adapter 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

In one or more embodiments, the receptacle/adapter 520 embodiments may coupled with battery packs that may be specific to a manufacturer in order to only fit specific types of battery packs. In other embodiments, the receptacle/adapter 520 embodiments may be a universal type of receptacle to fit one or more types of battery packs. In one embodiment, receptacle/adapter 520 embodiments may hold batteries having different types of voltages, such as 12 V., 18 V., 24 V., 36 V., etc. In one embodiment, receptacle/adapter 520 embodiments include a circuit that limits voltage/amperage for different types of electronic devices, which may have different power requirements.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

In the description above, numerous specific details are set forth. However, it is understood that embodiments may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a battery pack receptacle that removably couples to a battery pack used for a cordless device;
   a universal serial bus (USB) port that is coupled to the battery pack receptacle, wherein the battery pack is used as a power source for the USB port; and
   an attachment device coupled to the battery pack receptacle that attaches the battery pack receptacle to a utility bag.

2. The apparatus of claim 1, wherein the battery pack receptacle is coupled to the utility bag in one of a vertical and a horizontal state.

3. The apparatus of claim 1, further comprising a USB cord coupled to a USB receptacle.

4. The apparatus of claim 3, wherein the attachment device comprises a first foot portion and a second foot portion, wherein the first foot portion and the second foot portion are configured for locking the battery pack receptacle in a sleeve of the utility bag.

5. The apparatus of claim 4, wherein the attachment device includes a front coupling portion and a rear coupling portion, and the utility bag includes a protection component.

6. The apparatus of claim 5, wherein the protection component includes a battery connector terminal protection component.

7. The apparatus of claim 6, wherein the attachment device includes a front coupling portion, a rotational element and a rear coupling portion that combine to form a spring clip.

8. The apparatus of claim 6, wherein attachment device is rotatable on an attachment mounting element.

9. The apparatus of claim 7, wherein the attachment device is mounted in a pocket formed in an interior portion of the utility bag.

10. The apparatus of claim 9, wherein the attachment device is mounted over a loop material coupled to an interior bottom portion of the utility bag.

11. The apparatus of claim 10, wherein the attachment device is one of removably coupled to the utility bag, and permanently coupled to the utility bag.

12. The apparatus of claim 7, wherein the utility bag comprises one of: a sporting bag, a fishing bag, a luggage container, a backpack, a duffle bag, a tool bag, emergency services bag, a cooler, and a camping bag.

13. A system comprising:
    a utility bag;
    a battery pack receptacle that is coupled to the utility bag and removably receives a battery pack used for a cordless device;
    an attachment device coupled to the battery pack receptacle that attaches the battery pack receptacle to the utility bag; and
    a universal serial bus (USB) port coupled to the battery pack receptacle, wherein the battery pack receptacle transfers power from a received battery pack to the USB port.

14. The system of claim 13, further comprising a cord coupled to a USB receptacle.

15. The system of claim 13, wherein the battery pack receptacle is coupled to the utility bag in one of a vertical and a horizontal state, and the attachment device is one of rotatable and fixed on an attachment mounting element.

16. The system of claim 13, wherein the attachment device comprises a first foot portion and a second foot portion, wherein the first foot portion and the second foot portion are configured for locking the battery pack receptacle in a sleeve of the utility bag.

17. The system of claim 13, wherein the attachment device includes a front coupling portion and a rear coupling portion, and the utility bag includes a protection component.

18. The system of claim 13, wherein the attachment device includes a front coupling portion, a rotational element and a rear coupling portion that combine to form a spring clip.

19. The system of claim 13, wherein the attachment device is mounted in one of: a pocket formed in an interior portion of the utility bag, over a loop material coupled to an interior bottom portion of the utility bag.

20. The system of claim 13, wherein the utility bag comprises one of: a sporting bag, a fishing bag, a luggage container, a backpack, a duffle bag, a tool bag, emergency services bag, a cooler, and a camping bag.

* * * * *